United States Patent [19]

Lee

[11] Patent Number: 5,206,786

[45] Date of Patent: Apr. 27, 1993

[54] THROUGH TYPE CONDENSER

[75] Inventor: Soo-Cheol Lee, Suweon, Rep. of Korea

[73] Assignee: Samsung Electro-Mechanics Co., Ltd., Kyungki, Rep. of Korea

[21] Appl. No.: 800,594

[22] Filed: Nov. 27, 1991

[30] Foreign Application Priority Data

Nov. 28, 1990 [KR] Rep. of Korea ............ 90-18422

[51] Int. Cl.$^5$ ............................................. H01G 4/42
[52] U.S. Cl. ............................................. 361/302
[58] Field of Search ............ 361/302, 328, 329, 330, 361/323; 315/39.51

[56] References Cited

U.S. PATENT DOCUMENTS

| | | | |
|---|---|---|---|
| 3,585,468 | 6/1971 | Chertok et al. | 361/323 |
| 3,838,316 | 9/1974 | Brown et al. | 174/52 PE X |
| 4,370,698 | 1/1983 | Sasaki | 361/330 |
| 4,900,985 | 2/1990 | Tashiro et al. | 315/39.51 |
| 5,040,091 | 8/1991 | Yamaoka et al. | 361/302 |

Primary Examiner—Donald A. Griffin
Attorney, Agent, or Firm—Webb, Burden, Ziesenheim & Webb

[57] ABSTRACT

A through-condenser for supplying an accelerating voltage to a magnetron is disclosed, with the magnetron being for generating ultra-high frequency for microwave ovens and broadcasting apparatuses. The condenser includes a grounding plate, a pair of cylindrical ground electrodes, a pair of conductive rods, and a single insulating resin. The grounding plate is provided with a pair of through-holes, and the ground electrodes are inserted into the through-holes of the grounding plate in a conductive manner. The conductive rods respectively consist of a body portion, a tap terminal and an output terminal, and are inserted respectively through the ground electrodes in a non-conductive manner. The resin is injected to serve as an outer casing of the condenser and as a dielectric layer between the ground electrodes and the conductive rods.

18 Claims, 8 Drawing Sheets

THROUGH TYPE CONDENSER

FIELD OF THE INVENTION

The present invention relates to a magnetron apparatus for generating high power microwaves for using on microwave ovens, broadcasting apparatuses and the like, and particularly to a through condenser for supplying an accelerating voltage to the magnetron.

BACKGROUND OF THE INVENTION

Broadcasting apparatuses, microwave ovens and the like require high power microwaves. Usually, such microwaves are obtained by using a magnetron apparatus, and such a magnetron is installed within a shielding metal case in order to prevent the leaking of radio waves, with a through type condenser being used in supplying an accelerating voltage to the magnetron. The accelerating voltage which is supplied through the through type condenser is a very high voltage of about 4.2 KV, and therefore, the condenser has to be manufactured after taking into account its voltage resistent characteristics. Particularly, the microwaves which are generated from the magnetron after receipt of the accelerating voltage have a high frequency amounting to about 2.45 GHz in its primary wave. Further, there is a high possibility that secondary and tertiary harmonic waves can be leaked through the open-through type condenser to the outside, and therefore, a particular attention has to be given in manufacturing the through type condenser.

FIG. 1 illustrates the circuit of a magnetron, and, as shown in this drawing, a magnetron M1 is installed within a shielding case S1. Further, an accelerating voltage is supplied to a grounded positive electrode A1 and a heater H1 of the magnetron M1 through condensers C1,C2 which form an LC resonant circuit. Therefore, if a magnetic field is supplied in a direction perpendicular to the ground surface, the electrons emitted from the cathode arrive at the anode in a rotating manner. Under this condition, several electronic electrodes are formed due to the space charge. In accordance with the rotation of the electronic electrodes, microwaves are generated from the resonant circuit of the positive electrode.

In the field of this through type condenser technology, Nikio et al proposed a through type condenser having high voltage resistent characteristics and this invention has the title of "Through Type High-Withstand-Voltage Ceramic" and is disclosed in U.S. Pat. No. 4,370,698. As shown in FIG. 2, the through type condenser of Nikio et al includes: a ceramic body 14 having a pair of through-holes 12,13; a pair of conductive rods 10,11 passing through the through-holes 12,13; and an insulating resin member 16 completely surrounding the ceramic body 14 to form an outer casing. Here the elliptical ceramic body 14 serves as a dielectric medium for the condenser. However, the through type condenser as described above requires a large number of component members and an expensive ceramic body, and therefore, the productivity is lowered, as well as increasing the product unit price.

In an attempt to get rid of the above described disadvantages of the dielectric type through-condenser, a technology for manufacturing the through type condenser by means of a single resin member is developed as disclosed in Japanese Utility Model Application Laid-Open No. Sho-68-89664. As shown in FIGS. 3 and 4, this apparatus includes: a conductive core member 20 having a U-shaped main body 24 and a flat outer connecting terminal 22; a high potential inner electrode 26 having a guide slot 30 at its bottom 28 (cup-shaped and made of a metal) in order to guide the conductive core member 20; a cylindrical ground potential electrode 32 having a flange 36; and a single insulating resin member 38. Thus, this apparatus provides a through condenser which can be manufactured in a relatively simple manner.

Particularly, in this technology, the outer casing of the condenser and the insulating resin member which serves as a dielectric medium for the condenser are formed on a straight line. Therefore, when molding the resin, the flow of the resin can be promoted, with the result that the generation of inner pores can be inhibited, thereby improving the voltage resistent characteristics.

However, the apparatus of Japanese Utility Model Application Laid-Open No. Sho-68-89664 is encountered with many difficulties in its manufacturing process. First, the body of the conductive core member 20 has to be bent into a U-shape, and this not only lowers the productivity but also increases the number of the steps of the manufacturing process. Further, the cylindrical high potential inner electrode 26 has a bottom face 28, and therefore, it can not be manufactured by cutting an ordinary pipe, but it has to be manufactured as a separate unit component. Particularly, the bottom face 28 has to be provided with a guide slot 30 for passing the U-shaped body portion 24 of the conductive core member 20, thereby also increasing the number of the manufacturing steps.

Further, although the ground potential electrode 32 is simply cylindrical, one end of it has to be provided with a rectangular flange 36 in an integral form, and therefore, a high die technology and a high processing technology are required. Particularly, the flange 36 can not be other than rectangular, because two finished through-condensers are joined together by means of their flanges to form a pair, after the through-condensers are separately manufactured. In addition to the difficulties encountered in manufacturing the individual components, there are also encountered difficulties in assembling them. The cylindrical high potential electrode 26 and the conductive core member 20 have to be aligned exactly concentrically, and the high potential electrode 26 has to be also aligned with the ground potential electrode exactly concentrically. Therefore, special jigs are required in assembling them, and the electrical characteristics of the condensers can be deviated due to the errors existing in the jigs.

SUMMARY OF THE INVENTION

Therefore it is an object of the present invention to provide a through-condenser in which the number of the components is minimized, and the structure of the individual components is simplified, so that the manufacturing and the assembling of the condenser should be simplified.

It is another object of the present invention to provide a through-condenser in which the intrinsic capacitance and the voltage resistent characteristics are improved, and which can be formed in a compact type.

In achieving the above objects, the through-condenser according to the present invention includes: a ground plate having a pair of through-holes; a pair of cylindrical ground electrodes having a first electrode face, and for passing through the through-holes of the ground plate in a conductive manner; a pair of conductive rods having respectively an output terminal, a tap terminal and a body portion (having a second electrode face) in an integral form, and for passing through the cylindrical ground electrode in a non-conductive manner; and an insulating resin member for serving as both a dielectric medium between the first and second electrodes and as an outer casing for the condenser.

BRIEF DESCRIPTION OF THE DRAWINGS

The above objects and other advantages of the present invention will become more apparent by describing in detail the preferred embodiment of the present invention with reference to the attached drawings in which:

FIGS. 11-1 and 11-2 illustrate the distribution of the electric field around the corners of the electrodes.

DESCRIPTION OF THE PREFERRED EMBODIMENT

Figure 5:
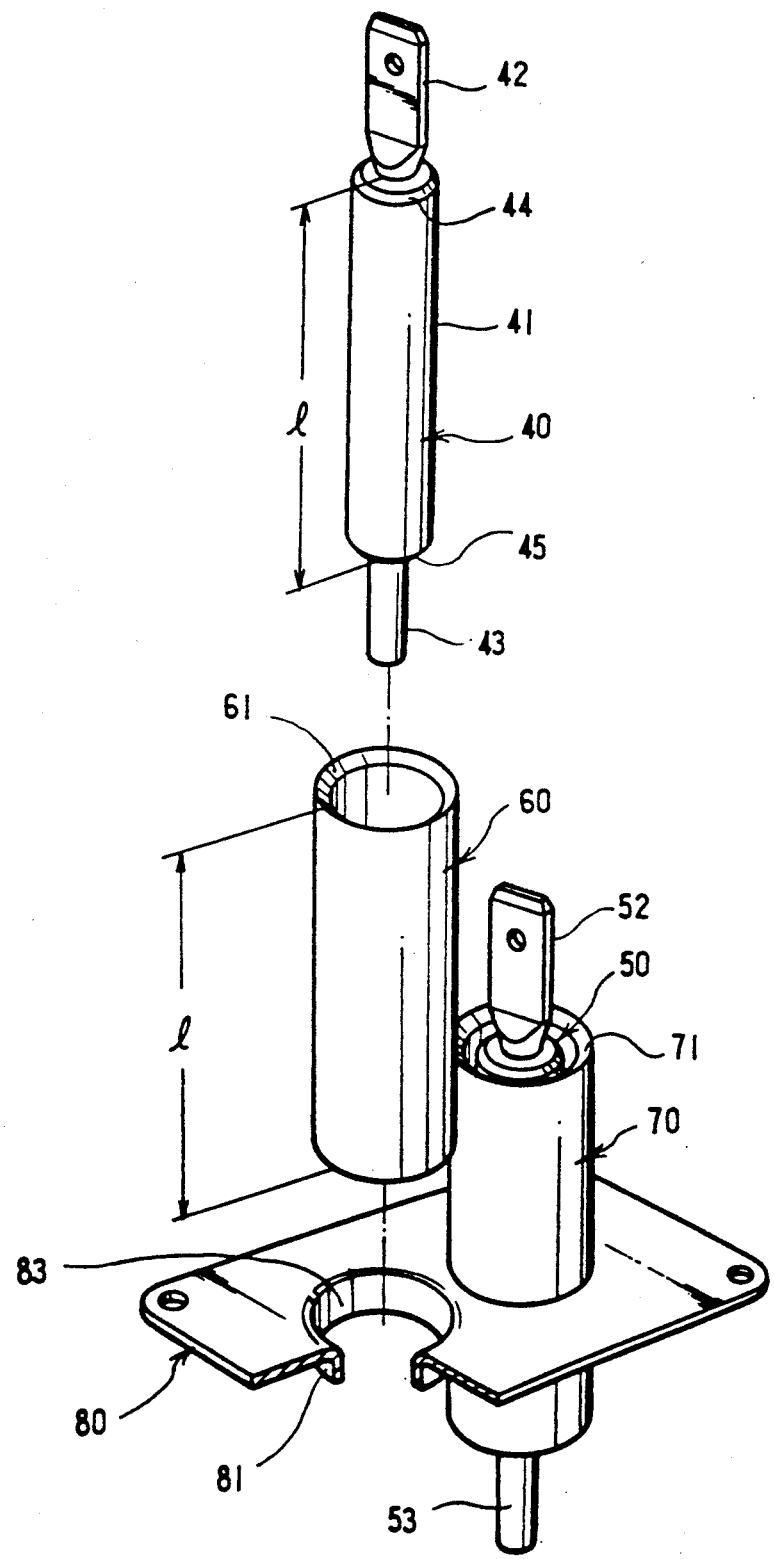
FIG. 5 is an exploded perspective view of the through-condenser according to the present invention.
Figure 6:
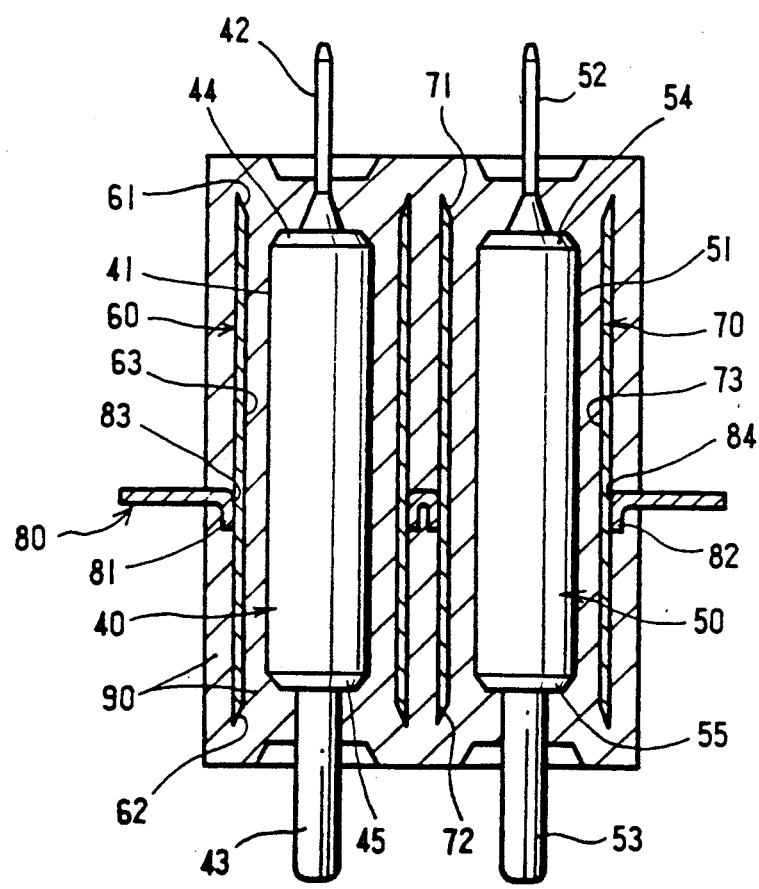
FIG. 6 is a sectional view showing the assembled state of the through-condenser of FIG. 5.

Referring to FIGS. 5 and 6, a rectangular grounding plate 80 is provided with a pair of through-holes 83,84. The through-holes 83,84 are provided with flanges 81,82 for assuring a stable coupling with ground electrodes 60,70 having a first electrode face. The ground electrodes 60,70 have a cylindrical form, and are made just by cutting a metal pipe in a certain length.

Conductive rods 40,50 are disposed within the cylindrical ground electrodes 60,70 in a non-conductive manner, and the conductive rods 40,50 are provided with tap terminals 42,52, output terminals 43,53, and body portions 41,51 in an integral form, while the outer faces of the body portions form second electrode faces. The tap terminals 42,52 and the output terminals 43,53 of the conductive rods 40,50 can be manufactured by machining the opposite ends of a conductive rod having the same diameter as that of the body portion. That is, the output terminals 43,53 are manufactured by machining one end of a conductive rod to a diameter smaller than that of the body portion, while the tap terminals 42,52 are manufactured by machining the other end of the conductive rod to the same form as that of the output terminals 43,53, with a forging process being added thereafter. Then the middle portion of the conductive rod becomes the body portion 41,51.

Meanwhile, a rounding or a chamfering is performed on the opposite edges of the body portions 41,51 of the conductive rods 40,50 in order to reinforce the voltage resistent characteristics of the condenser. Further, for the same purpose, a rounding or a chamfering is performed on the inner edges of the opposite ends of the cylindrical ground electrodes 60,70.

If the condenser is to be finished by assembling the above described components, first the cylindrical ground electrodes 60,70 are inserted through the through-holes 83,84 of the grounding plate 80. The cylindrical ground electrodes 60,70 are inserted through the through-holes 83,84 of the grounding plate 80. The cylindrical ground electrodes 60,70 are secured into the through-holes 83,84 by carrying out press-fitting, coking, soldering or welding, and the flanges 81,82 which are provided on the through-holes 83,84 assure the coupling of the ground terminals 60,70. The cylindrical ground electrodes 60,70 which are coupled in the above-described manner have their inner faces which serve as a first electrode face.

Then, the conductive rods 40,50 are passed through the cylindrical ground electrodes 60,70 in a non-conductive manner, and a jig (not shown) is used to secure the electrodes 60,70 and the conductive rods 40,50, in such a manner that the inner faces of the ground electrodes 60,70, i.e., the first electrode faces, and the outer faces of the body portions 41,51 of the conductive rods 40,50, i.e., the second electrode faces should be aligned on the same vertical line facing and opposing each other. Then an insulating resin 90 is injected into a certain die. The insulating resin 90 is injected between the first and second electrode faces and around the cylindrical ground electrodes 60,70. The insulating resin 90 thus injected serves as a dielectric medium between the first and second electrode faces, and as an outer casing for the condenser around the cylindrical ground electrodes. As the material for the insulating resin 90, a thermo-plastic thermosetting polymer resin having a high heat resistence and a high voltage resistence is advantageously used.

Meanwhile, the dielectric constant of the insulating resin 90 which serves as a dielectric medium between the first and second electrode faces is much lower than that of the ceramic material used in the conventional ceramic type through-condenser, but the area of the opposing faces of the first and second electrode faces is very large, thereby making it possible to maintain the required capacitance.

Meanwhile, the capacitance C of the through-condenser according to the present invention can be calculated based on the following formula.

$$C = \frac{2\pi\epsilon_\gamma\epsilon_0 l}{\ln\left(\frac{\phi_1}{2} / \frac{\phi_2}{2}\right)}$$

where $\epsilon_r$: Specific dielectric constant, $\epsilon_o$: dielectric constant in vacuum, l: the facing length of the first and second electrode faces, $\phi_1$: diameter of the body portion of the conductive rod, $\phi_2$: inside diameter of the cylindrical ground electrodes.

Figure 1:
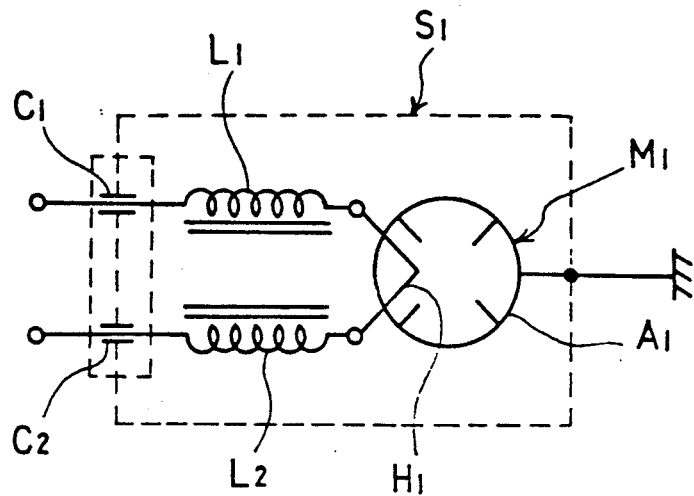
FIG. 1 illustrates schematically the circuit of the magnetron.
Figure 2:
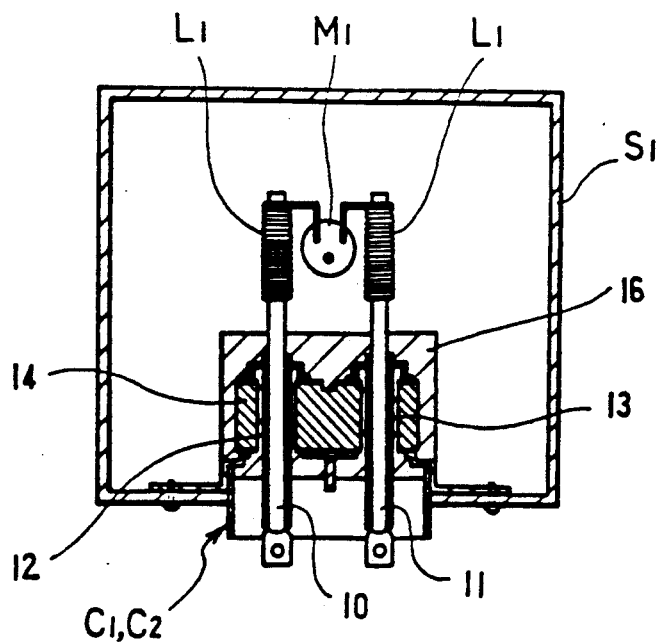
FIG. 2 is a sectional view showing the constitution of the conventional ceramic dielectric type through-condenser.
Figure 3:
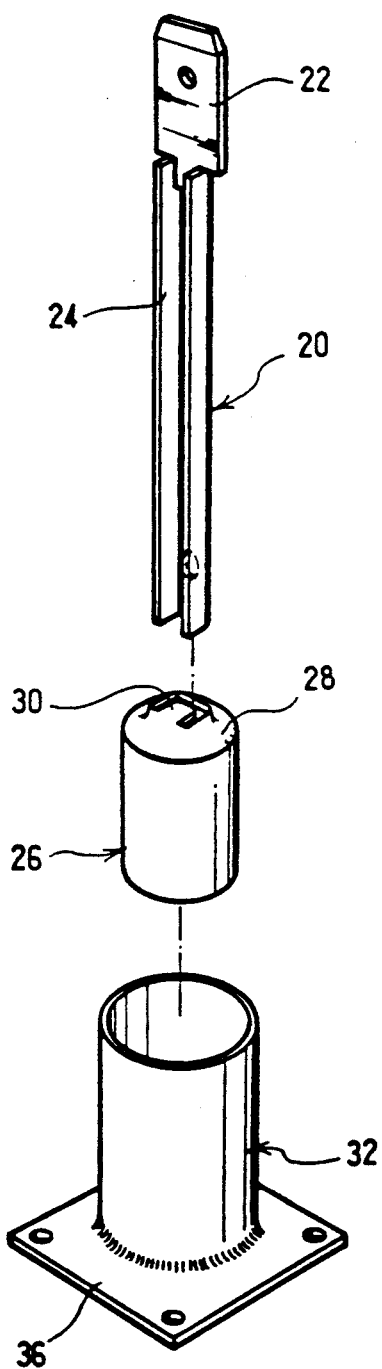
FIG. 3 is an exploded perspective view showing the constitution of the conventional single insulating resin dielectric type through-condenser.
Figure 4:
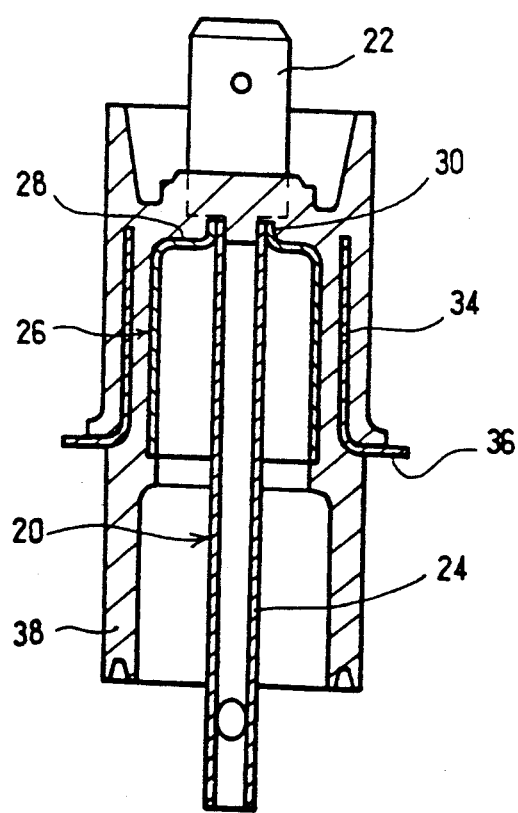
FIG. 4 is a sectional view showing the assembled state of the through-condenser of FIG. 3.
Figures 1, 11:
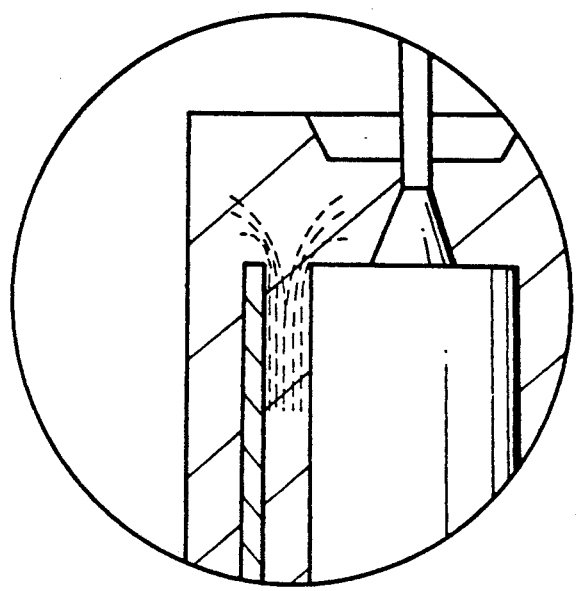
Figures 2, 11:
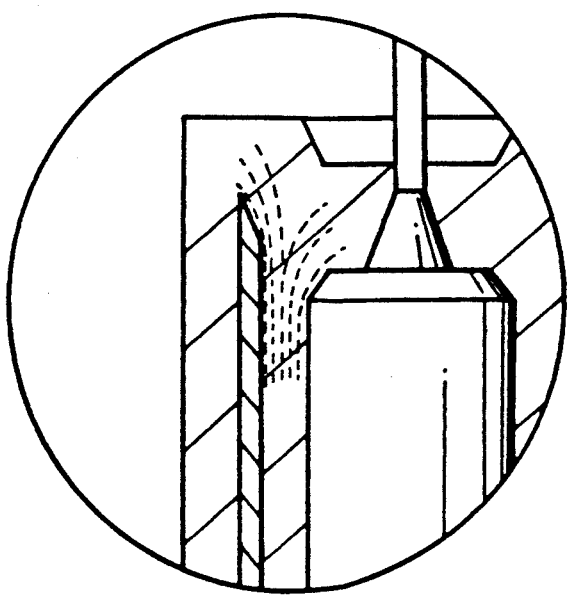

When disposing the ground electrodes 60, 70 and the conductive rods 40,50 so that they are opposed and aligned, it is advantageous to arrange it such that the opposite ends of the ground electrodes 60,70 and the opposite ends of the body portions 41,51 of the conductive rods 40,50 should have a height difference on the same vertical axis, because, as shown in FIG. 11-1, if their heights are the same, the electric fields are concentrated on the corner portions, and therefore, the voltage applied per unit of area in this region is increased, thereby markedly decreasing the voltage resistent characteristics of the condenser. Accordingly, it is desirable to arrange that the length of the body portions 41,51 of the conductive rods 40,50 be longer or shorter than that of the ground electrodes 60,70. Particularly, as shown in FIG. 11-2, a rounding or a chamfering is performed on the edges of the opposing ends of the ground electrodes 60,70 and the body portions 41,51 of the conductive rods. Thus, if rounding or chamfering portions 44,45,54,55,61,62,71,72 are formed, the electric fields can be uniformly distributed over the corner portions.

Figure 7:
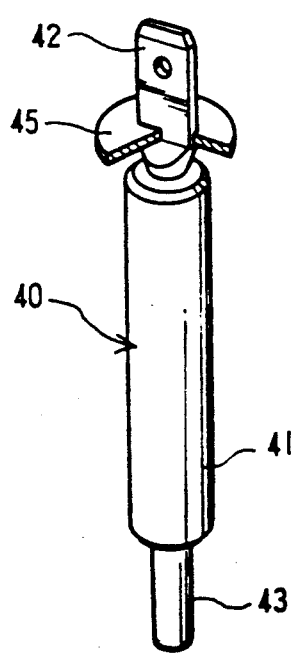
FIG. 7 illustrates another embodiment of the through-condenser of the present invention.
Figure 8:
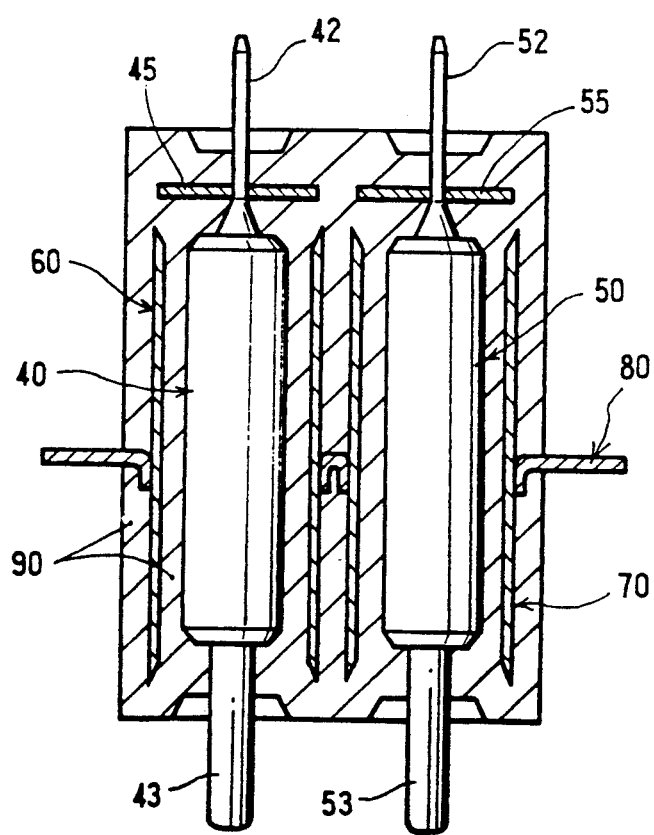
FIG. 8 is a sectional view showing the assembled state of the through-condenser of FIG. 7.

Meanwhile, FIGS. 7 and 8 illustrate another embodiment of the present invention, and, in this embodiment, disc-shaped caps 45,55 are additionally installed on the tap terminals 42,52, i.e., on the upper portions of the conductive rods 40,50 of the through-condenser according to the present invention which is described above.

The disc-shaped caps 45,55 shield the leakage of the output waves of the magnetron (leaking through the dielectric layer of the condenser), thereby preventing the generation of noise in the peripheral electronic apparatuses due to the leaking waves. Even if the disc-shaped caps 45,55 are installed on the side of the output terminals 43,53 of the conductive rods 40,50, the leaking of the output waves of the magnetron can be effectively prevented as described above. Particularly it is advantageous to form the disc-shaped caps 45,55 in such a shape that they should sufficiently cover the inside diameter of the ground electrodes 60,70 having the first electrode faces.

Figure 9:
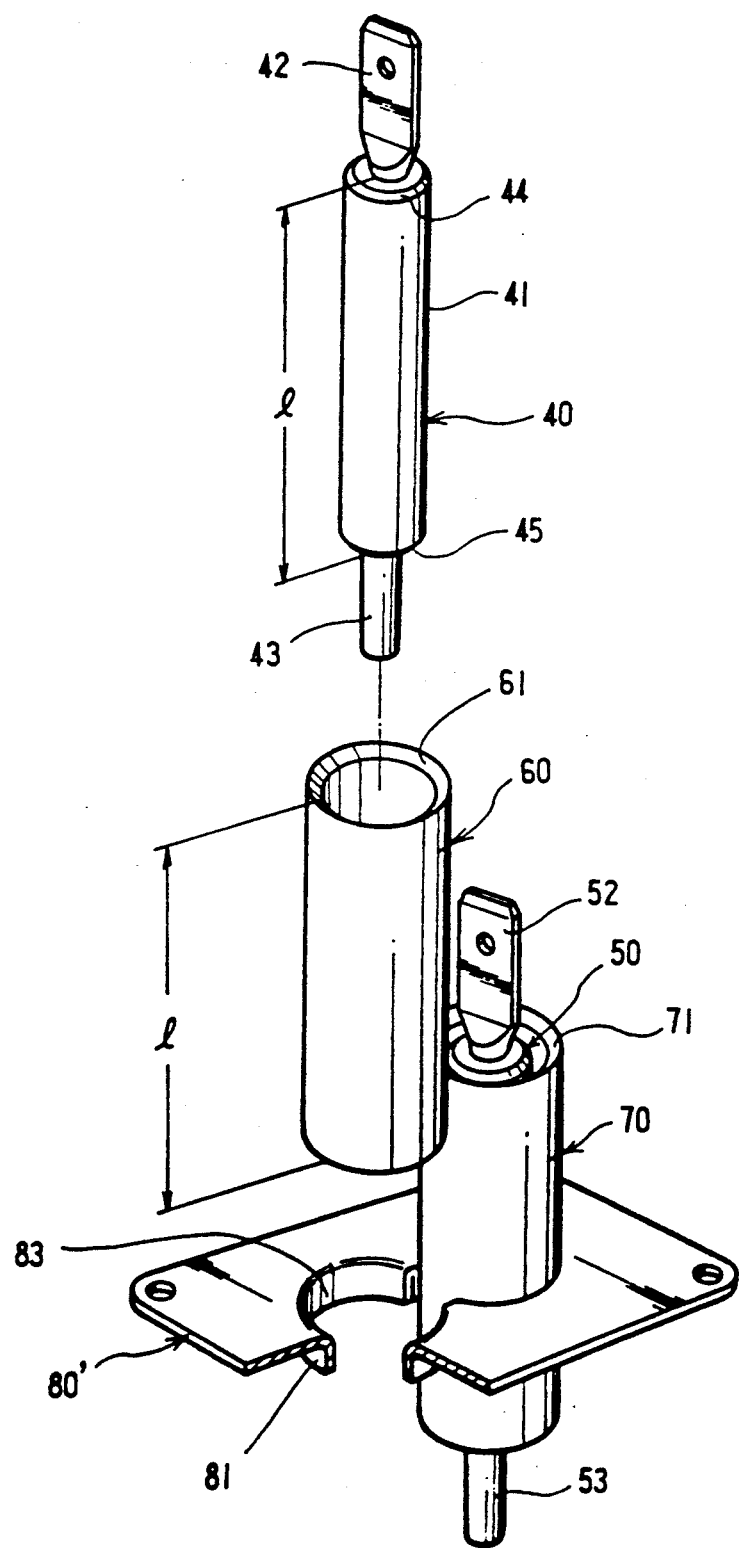
FIG. 9 is an exploded perspective view of still another embodiment of the through-condenser of the present invention.
Figure 10:
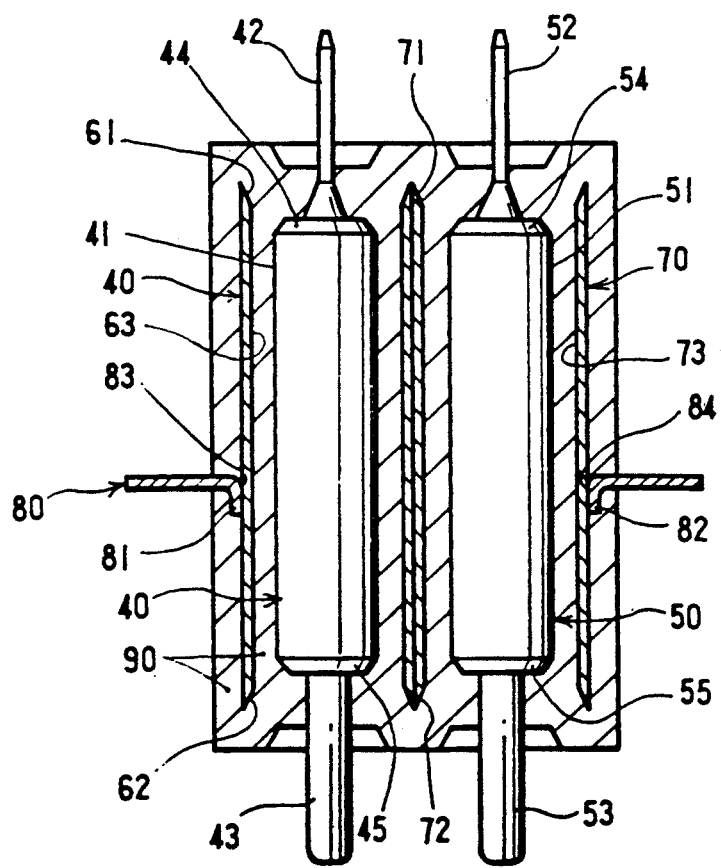
FIG. 10 is a sectional view showing the assembled state of the through-condenser of FIG. 9.

FIGS. 9 and 10 illustrate still another embodiment of the present invention. In this embodiment, the through-holes which are provided on the grounding plate are disposed close to each other in such a manner as to form the shape of numeral 8. Therefore, if the cylindrical ground electrodes 60,70 having the first electrode faces are inserted through the through-holes 83,84 of the grounding plate 80′, then the sides of the circumferential surfaces of the ground electrodes 60,70 are contacted to each other. In this state, the conductive rods 40,50 which have the body portions 41,51 of the second electrode faces are installed within the ground electrodes 60,70 in a non-conductive manner, and then, a single insulating resin is injected forming the dielectric layer between the first and second electrode faces and the outer casing, thereby completing the final structure of the through-condenser according to the present invention. In this case, the mechanical stability of the through-condenser is reinforced, and the size of the through-condenser can be minimized.

According to the present invention as described above, the number of the components of the through-condenser can be minimized, and the structure of the individual components can be simplified, with the result that the productivity and ability to assemble can be improved, that the product size can be reduced, and that the manufacturing cost can be saved.

What is claimed is:

1. A through-condenser comprising:
    a grounding plate having a pair of through-holes;
    a pair of cylindrical ground electrodes for being inserted into the pair of through-holes in a conductive manner;
    a pair of conductive rods for being inserted into said cylindrical ground electrodes in a non-conductive manner, and consisting respectively of a body portion, and a tap terminal and an output terminal formed integrally on the upper and lower ends of said body portion, with said body portion being disposed opposingly with the inner circumferential face of said ground electrode in order to serve as a positive electrode;
    said body portions of said conductive rods having a diameter larger than the diameter of said tap terminal and said output terminal, wherein the length of the body portion of said conductive rods is shorter than the length of said ground electrode; and
    a single insulating resin forming an outer casing of the condenser and a dielectric layer between said ground electrodes and said body portions.

2. The through-condenser as claimed in claim 1, wherein said through-holes of said grounding plate are formed such that their axes are disposed closer to each other so as for said through-holes to form the shape of numeral 8.

3. The through-condenser as claimed in claim 1, wherein said through-holes are provided respectively with a flange.

4. The through-condenser as claimed in claim 1, wherein said ground electrodes are press-fitted into said through-holes of said grounding plate.

5. The through-condenser as claimed in claim 1, wherein said insulating resin is a thermosetting polymer resin.

6. The through-condenser as claimed in claim 1, wherein said insulating resin is a thermoplastic polymer resin.

7. The through-condenser as claimed in claim 1, wherein a rounding is performed on the inner corners of the opposite ends of said ground electrodes.

8. The through-condenser as claimed in claim 1, wherein a rounding is performed on the corners of the opposite ends of said body portions of said conductive rods.

9. A through-condenser comprising:
    a grounding plate having a pair of through-holes;
    a pair of cylindrical ground electrodes for being inserted into the pair of through-holes in a conductive manner;
    a pair of conductive rods for being inserted into said cylindrical ground electrodes in a non-conductive manner, and consisting respectively of a body portion, and a tap terminal and an output terminal formed integrally on the upper and lower ends of said body portion, with said body portion being disposed opposingly with the inner circumferential face of said ground electrode in order to serve as a positive electrode; and
    a single insulating resin forming an outer casing of the condenser and a dielectric layer between said ground electrodes and said body portion, wherein a noise shielding disc-shaped cap is disposed on said conductive rod.

10. The through-condenser as claimed in claim 9, wherein said through-holes are provided respectively with a flange.

11. The through-condenser as claimed in claim 9, wherein said ground electrodes are press-fitted into said through-holes of said grounding plate.

12. The through-condenser as claimed in claim 9, wherein said insulating resin is a thermosetting polymer resin.

13. The through-condenser as claimed in claim 9, wherein said insulating resin is a thermo-plastic polymer resin.

14. A through-condenser comprising:
a grounding plate having a pair of through-holes;
a pair of cylindrical ground electrodes for being inserted into the pair of through-holes in a conductive manner;
a pair of conductive rods for being inserted into said cylindrical ground electrodes in a non-conductive manner, and consisting respectively of a body portion, and a tap terminal and an output terminal formed integrally on the upper and lower ends of said body portion, with said body portion being disposed opposingly with the inner circumferential face of said ground electrode in order to serve as a positive electrode; and
a single insulating resin forming an outer casing of the condenser and a dielectric layer between said ground electrodes and said body portion, wherein the ends of said ground electrodes and the ends of said body portions are disposed concentrically but in a stepped form.

15. The through-condenser as claimed in claim 14, wherein said through-holes are provided respectively with a flange.

16. The through-condenser as claimed in claim 14, wherein said ground electrodes are press-fitted into said through-holes of said grounding plate.

17. The through-condenser as claimed in claim 14, wherein said insulating resin is a thermosetting polymer resin.

18. The through-condenser as claimed in claim 14, wherein said insulating resin is a thermo-plastic polymer resin.

* * * * *

UNITED STATES PATENT AND TRADEMARK OFFICE
CERTIFICATE OF CORRECTION

PATENT NO. : 5,206,786
DATED : April 27, 1993
INVENTOR(S): Soo-Cheol Lee

It is certified that error appears in the above-identified patent and that said Letters Patent is hereby corrected as shown below:

Column 4 Lines 14-16 after "60-70" delete "are inserted through the through-holes 83,84 of the grounding plate 80. The cylindrical ground electrodes 60,70".

Column 4 Line 60 "1" should read -- $\ell$ --.

Column 4 Line 65 "1" should read -- $\ell$ --.

Column 5 Line 59 after "casing" insert --to be formed--.

Signed and Sealed this

Twenty-eighth Day of December, 1993

Attest:

BRUCE LEHMAN

Attesting Officer          Commissioner of Patents and Trademarks